Figures 1, 2:
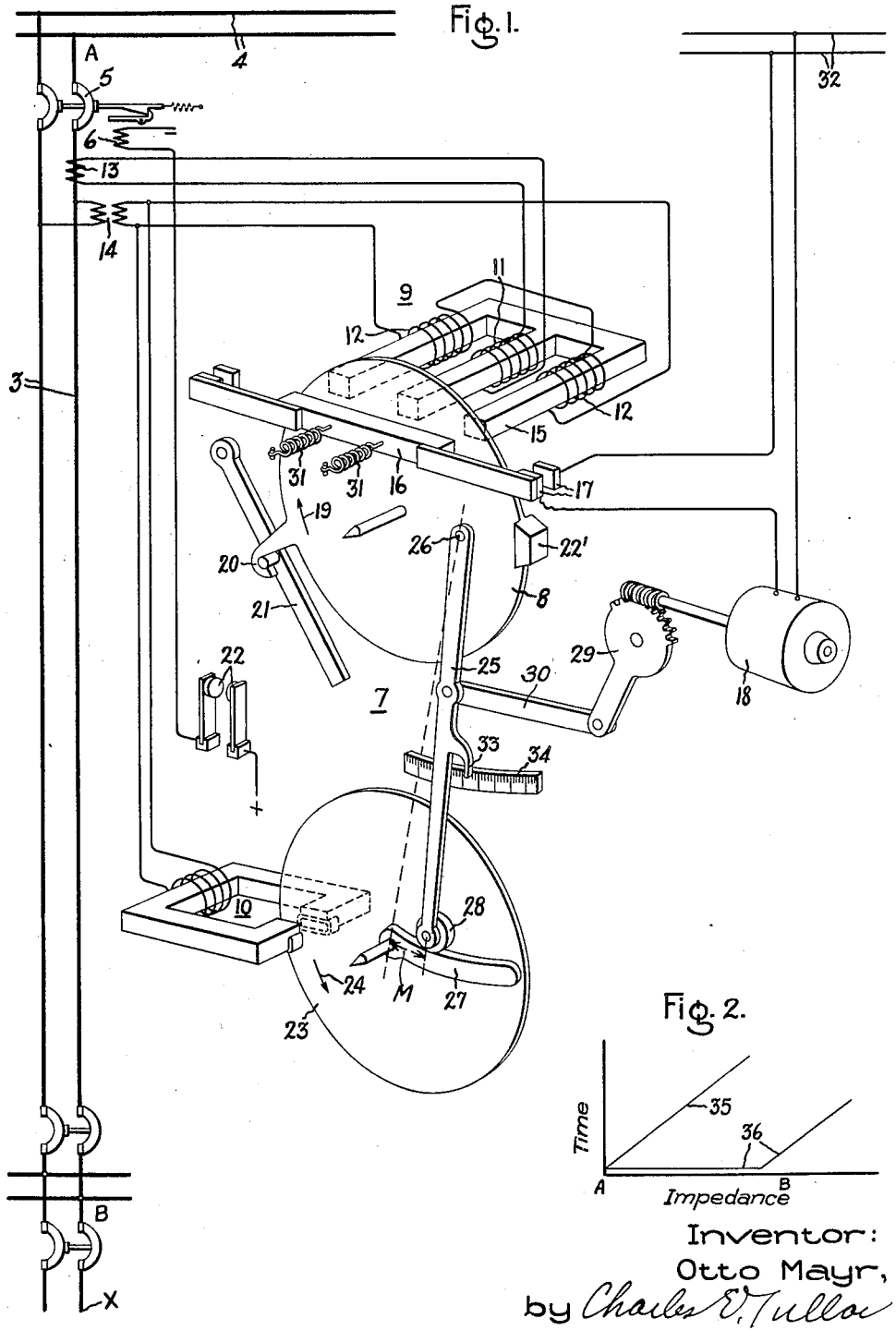

July 21, 1931.  O. MAYR  1,815,861

PROTECTIVE APPARATUS

Original Filed Feb. 11, 1929

Inventor:
Otto Mayr,
by Charles E. Tullar
His Attorney.

Patented July 21, 1931

1,815,861

UNITED STATES PATENT OFFICE

OTTO MAYR, OF KARLSHORST, GERMANY, ASSIGNOR TO GENERAL ELECTRIC COMPANY, A CORPORATION OF NEW YORK

PROTECTIVE APPARATUS

Application filed February 11, 1929, Serial No. 339,048, and in Germany March 13, 1928. Renewed May 4, 1931.

My invention relates to improvements in protective apparatus for electric circuits and more particularly to relays and especially relays of the so-called distance type whose time of action is a function of the distance between the fault and the relay and an object of my invention is to provide improved and simplified protective apparatus whereby more closely to approach the desired ideal in selective protection.

My invention will be better understood from the following description when considered in connection with the accompanying drawings and its scope will be pointed out in the appended claims.

In the accompanying drawings Fig. 1 illustrates an embodiment of my invention partly in diagram and partly in perspective and Fig. 2 illustrates time characteristics of apparatus embodying my invention.

In Fig. 1, a circuit 3, shown single-phase for simplicity, is arranged to be connected to a bus 4 by suitable circuit interrupting means such as a latched closed circuit breaker 5. This is provided with a trip coil 6 and is arranged to be controlled in accordance with my invention by a fault responsive protective means, such as a relay 7 which is arranged to function on the occurrence of abnormal circuit conditions in a time dependent on the distance between the relay and the fault.

In accordance with my invention, the relay 7 includes a movable member, such as a rotatably mounted disk 8 on which are exerted opposing effects by suitable cooperating means, shown as including motor elements 9 and 10. Further, in accordance with my invention, I provide means for varying the effect of one of these motor elements until a predetermined relation exists between the effects exerted by both of them. The motor element 9 constitutes an actuating means for the disk 8 in conjunction with which it may form a power directional relay having current and potential windings 11 and 12, respectively connected to be energized in accordance with a current and a voltage of the circuit 3 by suitable means such as current and potential transformers 13 and 14. The motor element 9, as shown, includes two magnetic members 15 and 16, the latter of which may be movable in response to a predetermined current in the winding 11 to control contacts 17 in the circuit of an operating device, such as a motor 18 of the means for varying the effect of the opposing means 10.

With power flow in the circuit 3 in a predetermined direction, the motor element 9 tends to turn the disk 8 in the direction indicated by the arrow 19. Sufficient movement of the disk 8 in this direction will disengage the catch 20 from the contact controlling member 21 so that it may engage and close contacts 22 in the circuit of the trip coil 6. In order to insure movement of the disk 8 in the direction indicated by the arrow 19 in case of faults so severe that the voltage is practically zero, the disk may be biased by suitable means, such as the weight 22'. Movement of the disk 8 in a direction opposite to that indicated by the arrow 19 is prevented by reason of the engagement of the catch 20 with the contact controlling member 21.

The opposing means is also shown as of the induction disk type, the motor element 10 being of the shaded pole eletromagnetic type and being arranged to tend to move its associated disk 23 in the direction indicated by the arrow 24. As illustrated, the motor element 10 is connected to be energized in accordance with a voltage of the circuit 3 through suitable means such as the potential transformer 14. The motor element 10, as is well known in the art, exerts a torque on the disk 23 which is substantially proportional to the square of the circuit voltage.

In order to prevent movement of the disk 8 in the direction indicated by the arrow 19 under ordinary conditions, the opposing effect of the motor element 10 is applied to the actuating effect of the motor element 9, in accordance with my invention, by means whose effect is variable to obtain the desired time selective relay action. As shown, this means comprises a member such as the rod 25, pivotally secured to the disk 8 at 26 and having its free end arranged for movement in an arcuate path which is movable with the disk 23 and whose center of curvature is the pivotal point 26. This arcuate path may be in the form of a curved arm 27 secured to the shaft of the disk 23 and engaged by a roller 28 on the rod 25.

In order that, for a given torque on the disk 23, the opposing effect thereof on the disk 8 may be varied in accordance with some desired time action, I provide in accordance with my invention means for moving the rod 25 so as to vary the position of the roller 28 relatively to the axis of rotation of the disk 23. For this purpose any suitable means may be provided but I have shown, for purposes of illustration, a motor 18 which may be of the constant speed type and which is arranged to actuate the rod 25 through the gear lever 29 and a link 30 pivotally connected to the rod 25. The motor 18, if of the constant speed type, will move the rod 25 uniformly and consequently the roller 28 so as to provide a desired characteristic as will hereinafter appear. The motor 18 is normally inactive but may be arranged to be energized in response to the abnormal condition for which the relay 7 is intended to operate. One way in which this can be done is to have the magnetic member 16 of the motor element 9 biased away from the cooperating magnetic member 15 by suitable means such as springs 31 so that the member 16 will be attracted upon the occurrence of a predetermined current in the winding 11 and thereby effect the closing of contacts 17 in the circuit of the motor 18 to energize the same from a suitable control source 32.

With the arrangement shown, it will be obvious that the torque on the disk 8 is proportional to the product $EIf(\phi)$, E and I being the voltage and current of the circuit respectively and $f(\phi)$ a function of the phase angle between them, depending upon whether the motor element 9 is constructed to operate in accordance with the actual power, the wattless power or some other arrangement. There is, consequently, exerted through the medium of the disk 8 on the rod 25 a force $F_1$ which is proportional to the torque exerted on the disk and may be represented as follows:

$$F_1 = K_1 EIf(\phi)$$

$K_1$ being a proportionality constant.

The torque exerted on the disk 23 is proportional to the square of the voltage, that is $E^2$, but this torque is transmitted to the disk 8 through the medium of the arm 27 and the rod 25 by a variable lever arm M which is equal to the distance between the axis of rotation of the disk 23 and the axis of rotation of the roller 28. The force transmitted to the disk 8 in consequence of the torque of the motor element is, therefore, dependent upon M and may be expressed as follows:

$$F_2 = \frac{K_2 E^2}{M}$$

$K_2$ being a proportionality constant.

The instantaneous position of the roller 28, that is to say the rod 25, therefore, determines the release of the contact controlling member 21 and, consequently, the time of this release may be controlled by the positioning of the rod 25. For example, if the axes of the pivot 26, the roller 28 and the disk 23 are in line, as indicated by the dashed line, M is zero and the force $F_2$ would be infinite so that the relay contacts would theoretically never be closed. As soon, however, as the motor 18 begins to increase the value of M, the force $F_2$ is decreased and movement of the disk 8 will occur as soon as the ratio between the forces $F_1$ and $F_2$ exceeds a predetermined value as will appear from the following. When there is equilibrium, that is the forces $F_1$ and $F_2$ are equal, there results the following equation:

$$\frac{K_2 E^2}{M} = K_1 EIf(\phi)$$

from which results:

$$M = \frac{K_2}{K_1} \frac{E}{If(\phi)}$$

When this condition of equilibrium is passed, that is when the ratio between E and $If(\phi)$ exceeds a predetermined value, the disk 8 moves in the direction indicated by the arrow 19 and effects the closing of the contacts 22. Since M increases proportionately to the time of movement of the rod 25 and since the value of M required for releasing the disk 8 is dependent on the ratio between E and $If(\phi)$, that is on the impedance of the length of the circuit 3 between the relay and the fault, the time of release is also dependent on this length. Of course, with power flow in a direction tending to move the disk 8 opposite that indicated by the arrow 19 no tripping action is effected.

By providing the rod 25 with an indicator 33 which moves over a scale 34 graduated in units corresponding to distance, it is possible, from the position in which the indicator is left at the instant of release, to determine the location of the fault.

Referring now to Fig. 2, if the horizontal and vertical axes represent respectively the circuit impedance Z and the time of relay action T, then the dependence between these two is represented by the inclined line 35, if the initial value of M is zero and then continuously increases. It is, however, often desired that the circuit breaker opening should occur as rapidly as possible if a fault is located on the section between the relay station A and a neighboring relay station B and that the time increase only in the case of faults on the far side of the latter station as indicated for example at X in Fig. 1. In this case the time characteristic should be in accordance with the curve 36. This can be obtained by letting the initial value of M, that is the distance between the axes of rotation of the disk 23 and the roller 28, have some other initial value than zero as shown in Fig. 1. This value of M will, of course, correspond to the impedance of the section A—B. In this case, all faults which are located within the section A—B are disconnected very quickly and the time gradation begins from the station B as indicated by the inclined portion of the time characteristic 36.

While I have shown and described my invention in considerable detail, I do not desire to be limited to the exact arrangement shown, but seek to cover in the appended claims all those modifications as fall within the true spirit and scope of my invention.

What I claim as new and desire to secure by Letters Patent of the United States, is:—

1. A relay including a movable member, cooperating means for exerting opposing effects on said member and means for varying the effect of one of said cooperating means to prevent movement of the member until a predetermined relation exists between the effects exerted by said cooperating means.

2. A relay including a movable member, cooperating means for exerting opposing effects thereon and means independent of said cooperating means for varying the effect of one of them to prevent movement of the member until a predetermined relation exists between the effects exerted by said cooperating means.

3. A relay including a movable member, actuating means for exerting an effect tending to move the member in one direction, opposing means for exerting an effect tending to move the member in the opposite direction and means independent of said actuating and opposing means for varying the effect of one of them to prevent movement of the member in said one direction until a predetermined relation exists between the effects exerted by said actuating and opposing means.

4. A relay including a movable member, actuating means for exerting an effect tending to move the member in one direction, opposing means for exerting an effect tending to move said member in the opposite direction and normally predominant to prevent movement of the member in said one direction and means independent of said actuating and opposing means for varying the effect of one of them to prevent movement of the member in said one direction until a predetermined relation exists between the effects exerted by said means.

5. A relay including a movable member, actuating means for exerting a force tending to move the member in one direction, opposing means for exerting a force tending to move the member in the opposite direction and normally predominant to prevent movement in said one direction and means independent of said actuating and opposing means for varying the force of one of them to prevent movement of the member in said one direction until the ratio between said forces exceeds a predetermined amount.

6. In combination with an electric circuit, a relay including a movable member, actuating means tending to move said member in one direction in accordance with a function of a current and a voltage of the circuit, opposing means tending to move said member in the opposite direction in accordance with a function of said voltage of the circuit normally predominant to prevent movement in said one direction and means independent of said actuating and opposing means for varying the effect of the opposing means to prevent movement of the member in said one direction until a predetermined relation exists between the current and the voltage energizing said actuating and opposing means.

7. In combination with an electric circuit, a distance relay for controlling the circuit including a movable member, actuating means connected to be energized in accordance with the power of said circuit and tending to move said member in one direction when the flow of power in the circuit is in a predetermined direction, opposing means connected to be energized in accordance with a voltage of the circuit and tending to move said member in the opposite direction, means for preventing the movement of the member in said opposite direction and means for varying the effect of said opposing means independently of the circuit voltage, arranged to be energized on the occurrence of an abnormal circuit condition to prevent movement of said member in said one direction until the ratio between the voltage and the current of the circuit exceeds a predetermined value.

8. In combination with an electric circuit, a distance relay for controlling said circuit including a movable member, actuating means tending to move said member in one direction in accordance with the product $EIf(\phi)$, $E$ and $I$ being respectively a voltage and a current of the circuit and $f(\phi)$ a function of the phase angle between them, opposing means tending to move said member in the opposite direction in accordance with $E^2$, $E$ being the said circuit voltage, means independent of said actuating and opposing means for preventing movement of said member in said one direction until the ratio between $E$ and $If(\phi)$ exceeds a predetermined value.

In witness whereof, I have hereunto set my hand this 22nd day of January, 1929.

OTTO MAYR.